(12) United States Patent
Iwaya

(10) Patent No.: US 9,538,271 B2
(45) Date of Patent: Jan. 3, 2017

(54) ELECTRONIC APPARATUS HAVING MICROPHONE

(71) Applicant: KYOCERA Corporation, Kyoto-shi, Kyoto (JP)

(72) Inventor: Ryosuke Iwaya, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/864,566

(22) Filed: Sep. 24, 2015

(65) Prior Publication Data

US 2016/0014488 A1 Jan. 14, 2016

Related U.S. Application Data

(63) Continuation of application No. PCT/JP2014/058816, filed on Mar. 27, 2014.

(30) Foreign Application Priority Data

Mar. 27, 2013 (JP) .................................. 2013-066114

(51) Int. Cl.
*H04R 9/08* (2006.01)
*H04R 11/04* (2006.01)
(Continued)

(52) U.S. Cl.
CPC ............. *H04R 1/021* (2013.01); *H04M 1/03* (2013.01); *H04R 3/005* (2013.01); *H04M 1/20* (2013.01);
(Continued)

(58) Field of Classification Search
CPC ..... H04R 1/021; H04R 3/005; H04R 2410/05; H04R 2499/11; H04M 1/03; H04M 1/20
(Continued)

(56) References Cited

U.S. PATENT DOCUMENTS 8,014,836 B2 9/2011 Konomi et al.
8,340,708 B2 12/2012 Fukazawa et al.
(Continued)

FOREIGN PATENT DOCUMENTS

JP 2000-307700 A 11/2000
JP 2006-279260 A 10/2006
(Continued)

OTHER PUBLICATIONS

International Search Report dated Jun. 17, 2014, issued for International Application No. PCT/JP2014/058816.
(Continued)

*Primary Examiner* — Duc Nguyen
*Assistant Examiner* — Sean H Nguyen
(74) *Attorney, Agent, or Firm* — Procopio Cory Hargreaves and Savitch LLP

(57) ABSTRACT

An electronic apparatus is disclosed. An electronic apparatus comprises an inner chassis, a microphone that is disposed inside the inner chassis and has a sound collecting surface for obtaining voice, and an outer casing that covers an outside of the inner chassis. The inner chassis includes a sound passing hole penetrating the inner chassis in such a position as to face the sound collecting surface. The outer casing includes an inner surface that faces the inner chassis and an edge that faces the inner chassis with a gap between the inner chassis and the edge. The inner surface includes a sound passing groove that communicates with the sound passing hole. The sound passing groove extends to the edge.

4 Claims, 3 Drawing Sheets

(51) Int. Cl.
*H04R 17/02* (2006.01)
*H04R 19/04* (2006.01)
*H04R 21/02* (2006.01)
*H04R 1/02* (2006.01)
*H04M 1/03* (2006.01)
*H04R 3/00* (2006.01)
*H04M 1/20* (2006.01)

(52) U.S. Cl.
CPC ....... *H04R 2410/05* (2013.01); *H04R 2499/11* (2013.01)

(58) Field of Classification Search
USPC ........................................................ 381/365
See application file for complete search history.

(56) References Cited

U.S. PATENT DOCUMENTS

| | | | |
|---|---|---|---|
| 8,768,405 B2 | 7/2014 | Fukazawa et al. | |
| 2008/0123891 A1* | 5/2008 | Kato | H04M 1/03 381/361 |
| 2010/0202649 A1* | 8/2010 | Inoda | H04R 1/021 381/361 |
| 2011/0237314 A1 | 9/2011 | Kajiwara et al. | |
| 2013/0251183 A1* | 9/2013 | Doller | H04R 1/086 381/368 |
| 2014/0240856 A1* | 8/2014 | Allore | B29C 45/14311 359/811 |

FOREIGN PATENT DOCUMENTS

| | | |
|---|---|---|
| JP | 2007-150393 A | 6/2007 |
| JP | 2009-290561 A | 12/2009 |
| JP | 2011-205494 A | 10/2011 |

OTHER PUBLICATIONS

Written Opinion of the International Searching Authority issued by Japan Patent Office for International Application No. PCT/JP2014/058816.

SO-03D Toriatsukai Setsumeisho, 2.1th edition, NTT Docomo Inc., Aug. 2012, p. 28.

* cited by examiner

ELECTRONIC APPARATUS HAVING MICROPHONE

CROSS-REFERENCE TO RELATED APPLICATION

The present application is a continuation based on PCT Application No. PCT/JP2014/058816 filed on Mar. 27, 2014, entitled "ELECTRONIC APPARATUS HAVING MICROPHONE MOUNTED THEREIN", which claims the benefit of Japanese Application No. 2013-066114, filed on Mar. 27, 2013, entitled "ELECTRONIC APPARATUS HAVING MICROPHONE MOUNTED THEREIN". The disclosure of the above applications are each incorporated herein by reference.

FIELD

Embodiments of the present disclosure relate to an electronic apparatus having a microphone.

BACKGROUND

Electronic apparatuses, such as cellular phones and smart phones, include microphones for transmission that are used for voice communication and are built in housings.

SUMMARY

An electronic apparatus having a microphone is disclosed. In one embodiment, an electronic apparatus comprises an inner chassis, a microphone that is disposed inside the inner chassis and has a sound collecting surface for obtaining voice, and an outer casing that covers an outside of the inner chassis. The inner chassis includes a sound passing hole penetrating the inner chassis in such a position as to face the sound collecting surface. The outer casing includes an inner surface that faces the inner chassis and an edge that faces the inner chassis with a gap between the inner chassis and the edge. The inner surface includes a sound passing groove that communicates with the sound passing hole. The sound passing groove extends to the edge.

DETAILED DESCRIPTION

An electronic apparatus 10 to which embodiments of the present disclosure are applicable is an apparatus including a microphone 40 that obtains voice. The electronic apparatus 10 of this type includes a cellular phone, a smart phone, a personal digital assistant (PDA), a tablet terminal, an IC recorder, and a voice recorder.

In one embodiment, the electronic apparatus 10 is described in a case where the electronic apparatus 10 is a smart phone as an example. In one embodiment, the microphone 40 is a microphone for noise cancelling and is disposed in an upper portion on a back surface side of the electronic apparatus 10. In addition, a microphone 49 for transmitting is disposed in a lower portion on a front surface side of the electronic apparatus 10, for example.

Figure 1:
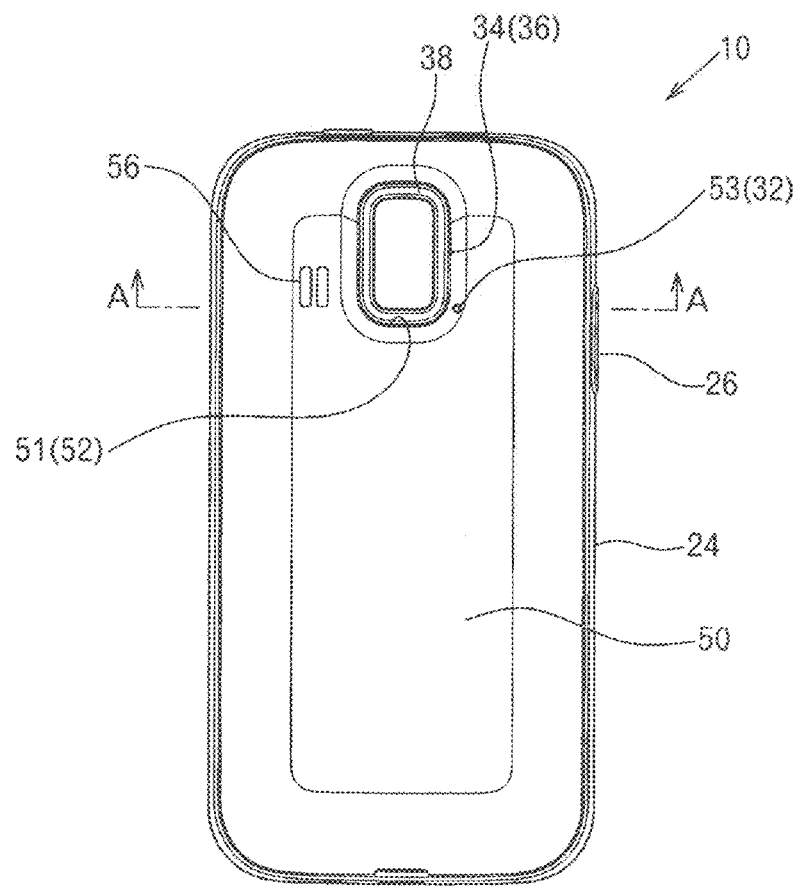
FIG. 1 illustrates a rear view of an electronic apparatus.
Figure 2:
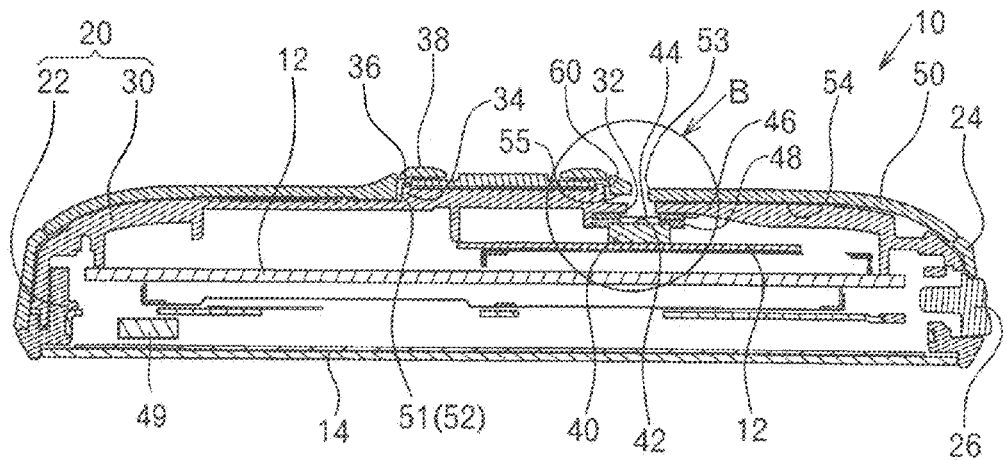
FIG. 2 illustrates a cross-sectional view taken along an A-A line in FIG. 1.

FIG. 1 illustrates a rear view of the electronic apparatus 10, and FIG. 2 illustrates a cross-sectional view taken along an A-A line in FIG. 1. In the electronic apparatus 10, a display 14 including a liquid crystal display panel and a touch panel is installed in a front surface of a housing 20 that houses a control substrate 12 or the like therein. A back surface of the housing 20 is covered with an outer casing 50 being a lid member.

The housing 20 is formed of an inner chassis 30 and a front chassis 22 that are water-tightly engaged with each other. The inner chassis 30 is covered with the outer casing 50. The front chassis 22 closes the inner chassis 30 from the front side and the display 14 is provided in the front chassis. A side peripheral surface of the housing 20 is covered with an annular protective member 24. In FIGS. 1 and 2, a numeral 26 is an operation button (for example, a volume adjustment).

More specifically, a projecting portion 34 is formed in a position being an upper portion in a longitudinal direction of FIG. 1 on a back surface of the inner chassis 30 to project from the inner chassis 30 to the back surface side. A camera, a light, and an infrared port, for example, are provided in the projecting portion 34. In the illustration, the projecting portion 34 is formed in a rounded rectangle having a protrusion 36 on a peripheral edge. An annular decorative panel 38 is installed on the top of the projecting portion 34 and the protrusion 36.

A recessed portion, which is not illustrated, is formed below the projecting portion 34 in the inner chassis 30, the recessed portion housing an electronic component that is mated and demated or inserted and removed by a user. The electronic component includes, for example, a battery being a power source for the electronic apparatus 10, a subscriber identity module (SIM) card, a secure digital memory card (SD card), and a micro SD card.

The microphone 40 for noise cancelling (hereinafter simply referred to as a "microphone") is disposed close to the projecting portion 34 and disposed on the right side seen from the back surface side in the illustration, and a speaker (not illustrated) is disposed on the left side.

Figure 3:
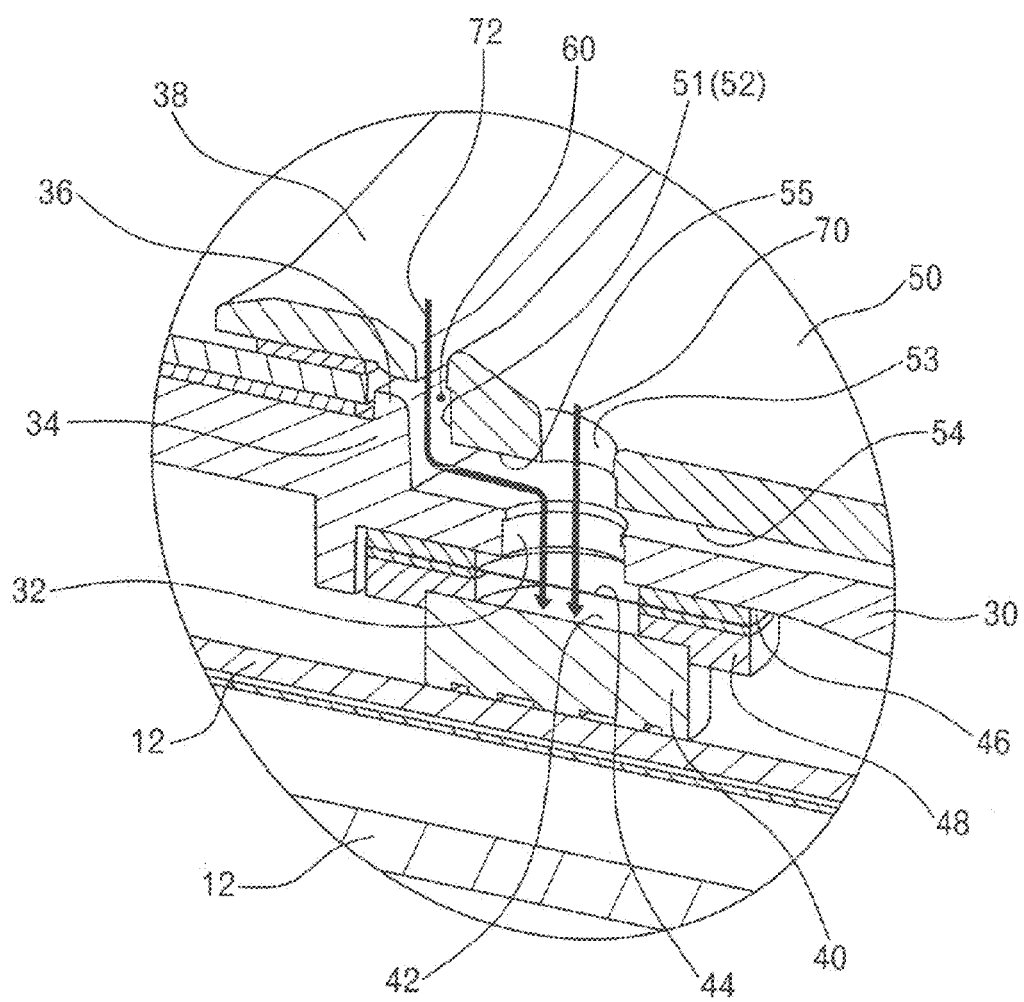
FIG. 3 illustrates a perspective view of a circled portion B in FIG. 2.

For more detailed descriptions of the microphone 40, as illustrated in FIG. 3, a sound collecting surface 42 for obtaining voice is formed on one surface of the microphone 40. The microphone 40 is formed such that the sound collecting surface 42 faces an inner surface 54 of the outer casing 50. An annular double-sided tape 46 having a two-layer structure with a waterproof sheet 44 sandwiched therebetween is bonded to a mounting surface, on which the microphone 40 is mounted, of the inner chassis 30. An annular cushion 48 is bonded to the double-sided tape 46.

The microphone 40 is electrically connected to a substrate 12. The microphone 40 is disposed such that a peripheral edge of the sound collecting surface 42 is pressed against the annular cushion 48.

The inner chassis 30 includes an inner sound passing hole 32 penetrating the inner chassis 30 in such a position as to face the sound collecting surface 42.

The outer casing 50 being the lid member closes the inner chassis 30 from the back surface side. As illustrated in FIGS. 1 to 5, the outer casing 50 includes an opening 51 slightly larger than a shape of a peripheral surface of the projecting portion 34 in which the above-mentioned camera or the like is provided. Further, the outer casing 50 includes an outer sound passing hole 53 in such a position as to face the inner sound passing hole 32. The outer sound passing hole 53 is formed close to an edge 52 of the opening 51.

The outer casing 50 preferably has a thickness of 1 mm or less to suppress thickening of the electronic apparatus 10. The outer casing 50 illustrated has a thickness of 0.8 mm. The outer casing 50 is installed on the inner chassis 30 in a state of almost closely contacting each other because the outer casing 50 is a thin-type. Thus, deformation and cracking of the outer casing 50 can be prevented.

Figure 4:
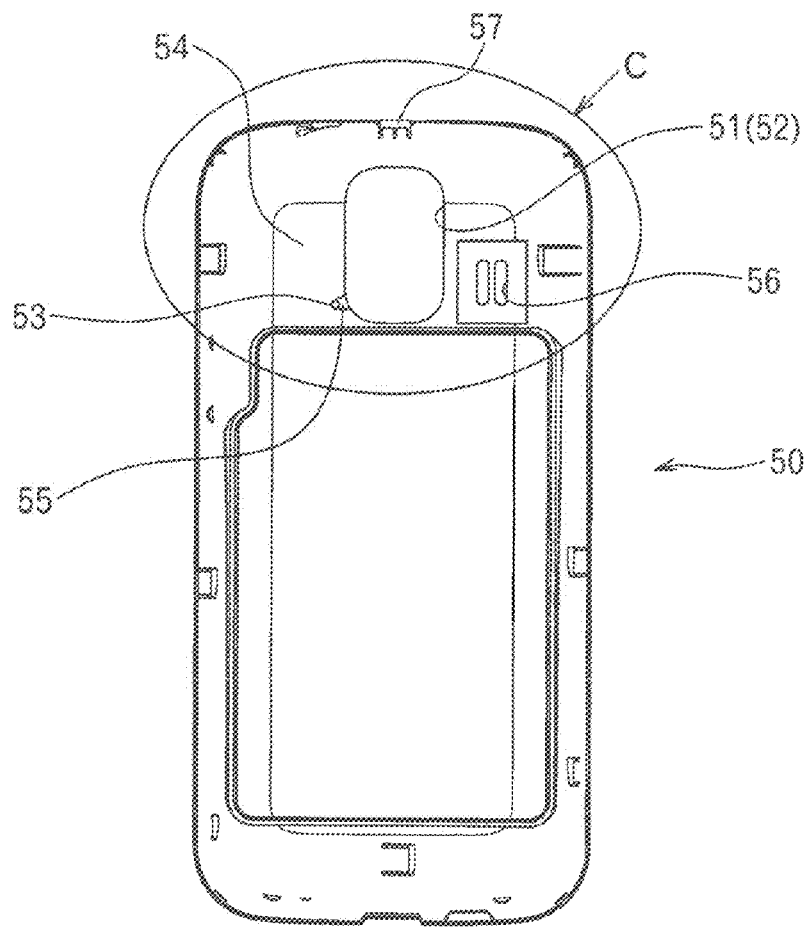
FIG. 4 illustrates a view of an outer casing seen from the inside.
Figure 5:
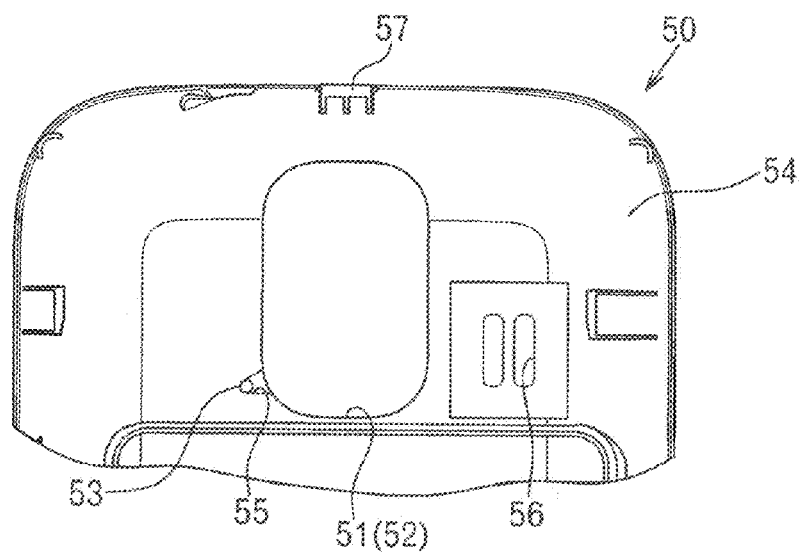
FIG. 5 illustrates an enlarged cross-sectional view of a circled portion C in FIG. 4.

As illustrated in FIGS. 3 to 5, a sound passing groove 55 recessed in the inner surface 54 of the outer casing 50 continues from the outer sound passing hole 53 and extends to the edge 52 of the opening 51. The sound passing groove 55 is preferably formed deep to increase the sound collecting performance to the extent that the strength of the outer casing 50 can be maintained. More specifically, the sound passing groove 55 preferably has a depth ¼ times to ⅔ times the thickness of the outer casing 50. The sound passing groove 55 illustrated has a depth ½ times the thickness of the outer casing 50, namely, 0.4 mm.

The sound passing groove 55 can have a fixed width. However, as illustrated in FIGS. 4 and 5, the sound passing groove 55 may have a shape with a width increasing toward the edge 52 of the opening 51. This can increase the sound collecting performance. The sound passing groove 55 preferably has a width of 0.5 mm to 3 mm. The sound passing groove 55 illustrated has a width of 1 mm on the outer sound passing hole 53 side and a width of 2 mm on the edge 52 side.

In addition, in FIGS. 1, 4, and 5, a numeral 56 is a speaker hole provided open in a position to face the speaker.

A hook piece 57 (see FIG. 5) is provided on the outer casing 50. A recessed portion (not illustrated) engaged with the hook piece 57 is provided in the inner chassis 30. The hook piece 57 is engaged with the recessed portion, so that the outer casing 50 can be installed on the inner chassis 30.

When the outer casing 50 is installed on the inner chassis 30, the inner sound passing hole 32 and the outer sound passing hole 53 face and communicate with each other, as illustrated in FIG. 3. Further, the inner sound passing hole 32 also communicates with the sound passing groove 55.

The opening of the outer casing 50 is formed slightly larger than the projecting portion 34. Therefore, as illustrated in FIG. 3, the edge 52 of the opening 51 faces the projecting portion 34 with a gap 60 between the projecting portion 34 and the edge 52.

Thus, sound paths to the sound collecting surface 42 of the microphone 40 include two routes that are a first sound path 70 passing through the inner sound passing hole 32 from the outer sound passing hole 53 and a second sound path 72 passing through the sound passing groove 55 and the inner sound passing hole 32 from the gap 60 between the projecting portion 34 and the edge 52.

Therefore, when a user closes the outer sound passing hole 53 with, for example, a finger and the first sound path 70 is blocked, voice enters from the second sound path 72, so that the sound collecting surface 42 can obtain the voice.

The gap 60 between the projecting portion 34 and the edge 52 particularly extends long along the projecting portion 34, and thus it is hardly assumed that the entire gap 60 is closed. In other words, there is a low possibility that the second sound path 72 is completely closed, which hardly reduces the performance of obtaining environmental sound in the microphone 40. Therefore, the microphone 40 can maintain the noise cancelling function, and the sufficient transmission performance can be secured.

In addition, each part of the configuration of embodiments of the present disclosure is not limited to one embodiment described above and can be varied in different ways.

For example, the outer sound passing hole 53 is formed in the outer casing 50 as described above, but the formation of the outer sound passing hole 53 can be omitted.

The microphone 40 is not limited to a microphone for noise cancelling and may be a transmission microphone. Moreover, the structure as described above is applicable to at least one of a receiver for receiving and a speaker for outputting voice.

The sound passing groove 55 is extended to the edge 52 of the opening 51 as described above, but an edge reached by the sound passing groove 55 is not limited to the edge of the opening 51 and may be, for example, the peripheral edge of the outer casing 50. The projecting portion 34 facing the edge 52 is not limited to that in which a camera or the like is provided and may be a projecting portion in which devices such as an operation button, an earphone jack, and a charge connector are provided. The projecting portion 34 may be a projecting portion formed in the inner chassis 30 for the devices.

Although the present disclosure has been described in detail, moreover, the above description is only illustrative in all aspects and the present disclosure is not restricted thereto. Numerous variants which are not illustrated can be supposed without departing from the scope of the present disclosure.

The invention claimed is:

1. An electronic apparatus having a microphone, comprising:
    an inner chassis comprising a first surface and a second surface opposite the first surface, wherein the second surface comprises a projecting portion that projects from the second surface;
    a microphone that comprises a sound collecting surface facing the first surface of the inner chassis; and
    an outer casing that covers at least a portion of the second surface of the inner chassis,
    wherein the inner chassis includes an inner sound passing hole penetrating from the second surface to the first surface of the inner chassis in such a position as to face the sound collecting surface,
    wherein the outer casing includes an inner surface that faces the at least a portion of the second surface of the inner chassis, and an edge that extends towards, but does not abut, at least a portion of the projecting portion of the second surface of the inner chassis such that a gap is disposed between the edge and the at least a portion of the projecting portion,
    wherein the inner surface of the outer casing includes a sound passing groove that extends from the gap to the inner sound passing hole of the inner chassis to form a first sound path from the gap through the inner sound passing hole to the sound collecting surface.

2. The electronic apparatus having a microphone according to claim 1, wherein the outer casing includes an outer sound passing hole penetrating from an outside surface, the outer casing to the inner surface of the outer casing in such a position as to face the inner sound passing hole in the inner chassis to form a second sound path from the outer sound passing hole through the sound passing hole to the sound collecting surface.

3. The electronic apparatus having a microphone according to claim 1, wherein the sound passing groove has a shape with a width increasing toward the edge.

4. The electronic apparatus having a microphone according to claim 1, wherein the microphone is a microphone for noise cancelling and is provided on a back surface side of the electronic apparatus, the electronic apparatus further comprising a microphone for transmission on a front surface side of the electronic apparatus.

\* \* \* \* \*